Aug. 18, 1936.  K. RÄNTSCH ET AL  2,051,392

DEVICE FOR COPYING LENTICULATED FILMS BY PROJECTION

Filed June 21, 1934

Kurt Räntsch and
Hans Neugebauer
INVENTORS.
BY: Gifford, Scull & Burgess
ATTORNEYS.

Patented Aug. 18, 1936

2,051,392

UNITED STATES PATENT OFFICE 2,051,392

DEVICE FOR COPYING LENTICULATED FILMS BY PROJECTION

Kurt Räntsch, Teltow-Seehof, near Berlin, and Hans Neugebauer, Berlin-Lichterfelde, Germany, assignors to Opticolor Aktiengesellschaft, Glarus, Switzerland, a corporation of Switzerland Application June 21, 1934, Serial No. 731,586
In Germany July 5, 1933

6 Claims. (Cl. 88—24)

Our invention relates to a device for copying lenticulated films by projection. It is an improvement of those devices serving for the same purposes which are described in the pending application Ser. No. 688,545, filed September 8, 1933, of Kurt Räntsch relating to "Printing apparatus for lenticulated films". These formerly described devices are characterized by the fact that the objectives which form an image of the original film on the duplicate film have an aperture which is too small for getting satisfying duplicates and that, in order to compensate for this, plane reflecting surfaces are so arranged that the said apertures are seen, from the films, in different directions. These directions are the same in which the filter zones of the multicolor screen were seen from the film during the exposure in the camera.

Now we found that such devices may be improved by arranging the plane mirrors and the lenses at such distances that the apertures of these lenses are seen from the films in directions which are more or less different from those in which the corresponding filter zones are seen during exposure or projection. By such arrangement we succeed in compensating for asymmetrical color degradations following from light diffusion in the photographic layer.

When, for instance, a taking filter of circular shape was employed with lateral zones, being shaped as segments and adjacent to the central zone along straight lines, the light diffusion between the two lateral zones is less intensive than between a lateral and the central zone. The color of the central zone is more degraded on the original film than that of a lateral one which we may compensate for by copying with a device according to this invention. For we take care that the lateral apertures seen from the films have a greater distance from the central aperture than the corresponding lateral zones have from the central one.

When the apertures are not of the same shape as the filter zones the centers of gravity of the zones and apertures are compared.

Some examples of the new devices are drawn in the figures, of which

Figure 1:
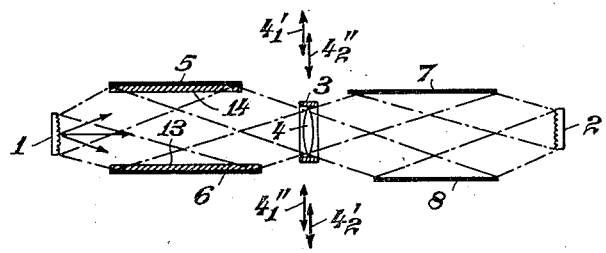
Figures 1 and 3 are plan views of two different devices.

In Fig. 1 the lens 3 forms an image of the original film 1 at the film 2. It is placed at half the way between the two films. Its aperture 4 is seen from the films directly. The mirrors 5 and 6 are arranged parallel to the optical axis of the lens at such distances from the axis that images of the aperture 4 are seen at $4_1'$ and $4_1''$. Similarly the aperture 4 is seen from the films 2 by the help of the mirrors 7 and 8 at $4_2'$ and $4_2''$ respectively.

The mirror 7 is parallel to 6 and both have the same distance from the axis. The same holds with respect to the mirrors 5 and 7. Some light beams pass directly from the film 1 by the objective 3 to the film 2. Their direction corresponds to that of the light beams passing by the central zone during the exposure. Other light beams take their way from the film 1 over the mirror 5, the lens 3, the mirror 8 to the film 2. Their direction corresponds to one lateral zone. Finally some beams take their way from the film 1 over the mirror 6, the lens 3, the mirror 7 to the film 2, corresponding to the other lateral zone.

Figure 2:
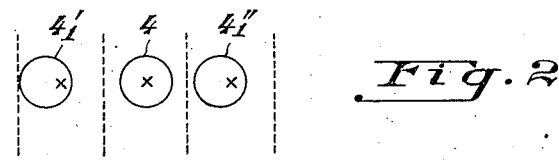
Figures 2 and 4 are the apertures seen from the films in Figure 1 or 3 respectively.

The aperture 4 and its images $4_1'$ and $4_1''$ drawn in Fig. 2 are seen from the film 1. Between the broken lines are the filter zones seen from the same film during the exposure. The small crosses represent the centers of these zones. The circles are excentric to these crosses.

In order to independently reduce the intensities of the three different light beams we may place neutral screens 14 and 13 of suitably chosen densities in front of the mirrors 5 and 6 respectively.

Figure 3:
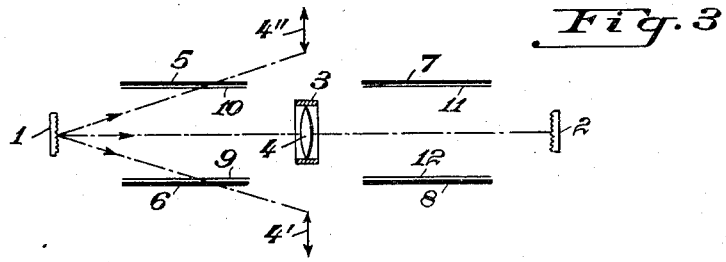
Figure 4:
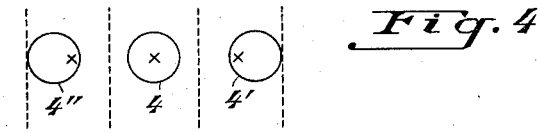

The device represented in Fig. 3 is very similar to that of Fig. 1, the chief difference being that the mirrors 5, 6, 7 and 8 have all the same distance from the axis of the lens 3. Thus the images of the apertures are seen at 4' and 4'' from the film 1 as well as from the film 2, and Fig. 4 is symmetrical.

Instead of providing neutral density screens 13 and 14, the reflecting surfaces of the mirrors are formed by different partially reflecting substances as silver, gold or copper.

Each of the mirrors 5 to 8 intersects the plane of the pupil of the objective in a straight line. When this line is identic with one of the broken lines, representing in Fig. 2 or 4 the boundary between the central and one lateral zone, and when the broken lines are at equal distances from each other, the image of the aperture seen in this mirror is concentric to the corresponding filter zone. When the mirror is removed from the optical axis the distance between the aperture and its lateral image is increased.

While we have shown the invention as embodied in a specific form, it is to be understood that various changes in details may be made without departing from the scope of the invention, as defined by the appended claims.

We claim:

1. In combination, an original film having thereon a multiplicity of lenticulations and a group of color records behind each of said lenticulations formed by exposure of the film through a color filter having as many zones as there are records in said group, a copy film having similar lenticulations thereon, means for passing light through the original film to the copy film, a lens disposed in the path of light passing between said films, optical means causing said lens to be seen from the lenticulations of the original film in the same number of different positions as there are zones in said filter, said optical means likewise causing said lens to be seen from the lenticulations of the copy film in a plurality of positions corresponding in number to the number of zones in said filter, but in different positions from the positions in which those zones are seen from the lenticulations of the original film during said exposure when said color records are being formed.

2. In combination, an original film having thereon a multiplicity of lenticulations and a group of color records behind each of said lenticulations formed by exposure of the film through a color filter having as many zones as there are records in said group, a copy film having similar lenticulations thereon, means for passing light through the original film to the copy film, a lens disposed in the path of light passing between said films, optical means causing said lens to be seen from the lenticulations of the original film in the same number of different positions as there are zones in said filter, said optical means likewise causing said lens to be seen from the lenticulations of the copy film in a plurality of positions corresponding in number to the number of zones in said filter, but in different positions from the positions in which those zones are seen from the lenticulations of the original film during said exposure when said color records are being formed, and means reducing the intensity of light appearing to reach the film from said images.

3. In combination, an original film having thereon a multiplicity of lenticulations and a group of color records behind each of said lenticulations formed by exposure of the film through a color filter having as many zones as there are records in said group, a copy film having similar lenticulations thereon, means for passing light through the original film to the copy film, a lens disposed in the path of light passing between said films, optical means causing said lens to be seen from the lenticulations of the original film in the same number of different positions as there are zones in said filter, said optical means likewise causing said lens to be seen from the lenticulations of the copy film in a plurality of positions different from the positions in which seen from the lenticulations of the original film.

4. In combination, an original film having thereon a multiplicity of lenticulations and a group of color records behind each of said lenticulations formed by exposure of the film through a color filter having as many zones as there are records in said group, a copy film having similar lenticulations thereon, means for passing light through the original film to the copy film, a lens disposed in the path of light passing between said films, optical means causing said lens to be seen from the lenticulations of the original film in the same number of different positions as there are zones in said filter, said optical means likewise causing said lens to be seen from the lenticulations of the copy film in a plurality of positions different from the positions in which seen from the lenticulations of the original film, and means reducing the intensity of light appearing to reach the film from said images.

5. In combination, an original film having thereon a multiplicity of lenticulations and a group of color records behind each of said lenticulations formed by exposure of the film through a color filter having as many zones as there are records in said group, a copy film having similar lenticulations thereon, means for passing light through the original film to the copy film, a lens disposed in the path of light passing between said films, optical means causing said lens to be seen from the lenticulations of the original film in the same number of different positions as there are zones in said filter, mirrors disposed generally parallel to the optical axis of the lens between the lens and the original film and adapted to form images of the lens on opposite sides thereof as viewed from the original film, and other mirrors disposed generally parallel to the optical axis of the lens and adapted to form images of the lens on opposite sides thereof as viewed from the copy film, said images as seen from the copy film occupying different positions than those seen from the original film.

6. In combination, an original film having thereon a multiplicity of lenticulations and a group of color records behind each of said lenticulations formed by exposure of the film through a color filter having as many zones as there are records in said group, a copy film having similar lenticulations thereon, means for passing light through the original film to the copy film, a lens disposed in the path of light passing between said films, optical means causing said lens to be seen from the lenticulations of the original film in the same number of different positions as there are zones in said filter, mirrors disposed generally parallel to the optical axis of the lens between the lens and the original film and adapted to form images of the lens on opposite sides thereof as viewed from the original film, other mirrors disposed generally parallel to the optical axis of the lens and adapted to form images of the lens on opposite sides thereof as viewed from the copy film, said images as seen from the copy film occupying different positions than those seen from the original film, and neutral screens disposed adjacent the faces of certain of said mirrors to decrease the intensity of the light reflected thereby.

KURT RÄNTSCH.
HANS NEUGEBAUER.